Figure 1:
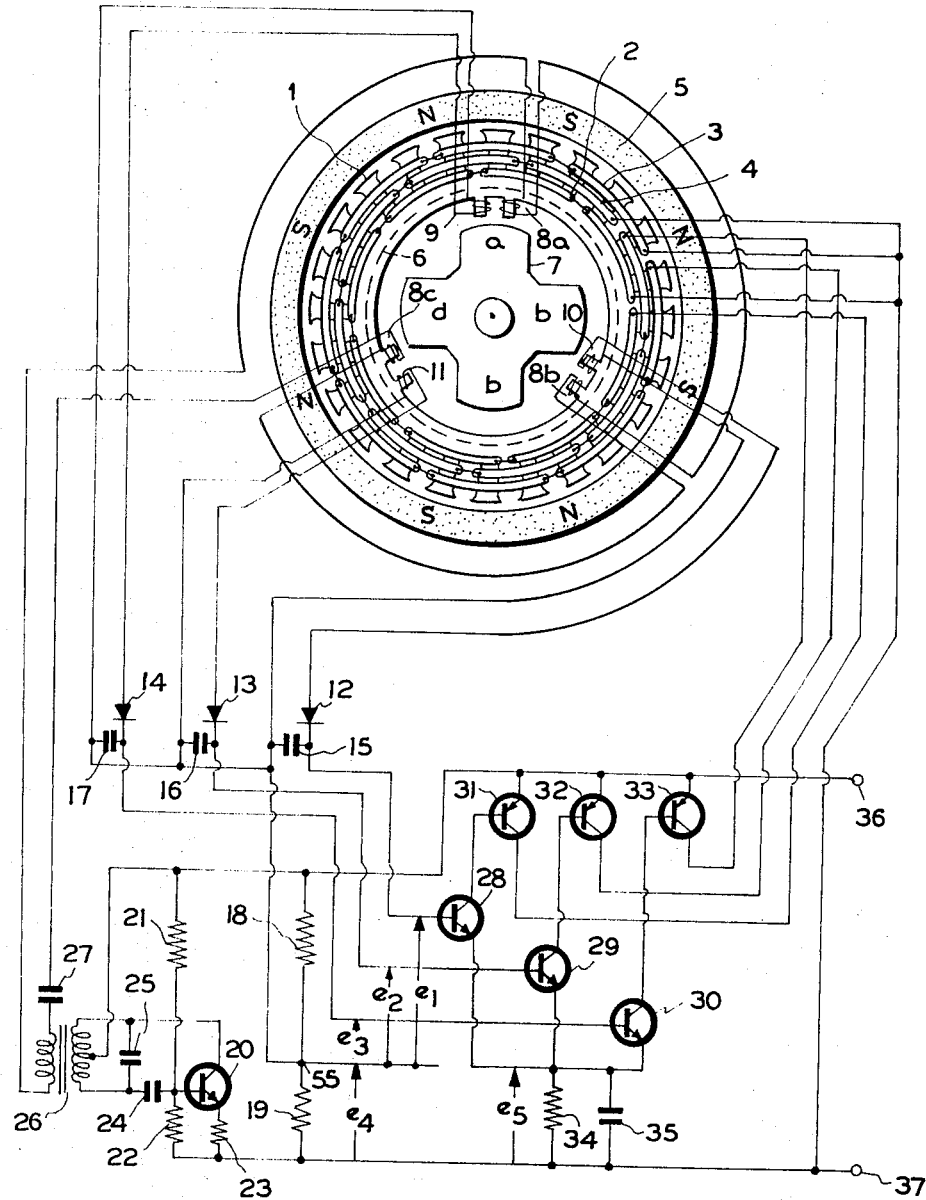

United States Patent

[11] 3,590,353

[72] Inventors Kazutsugu Kobayashi;
 Hisayuki Matsumoto; Yoshiaki Igarashi, all of Osaka, Japan
[21] Appl. No. 840,156
[22] Filed July 9, 1969
[45] Patented June 29, 1971
[73] Assignee Matsushita Electric Industrial Co., Ltd. Kadoma, Osaka, Japan
[32] Priority July 15, 1968, Oct. 9, 1968
[33] Japan
[31] 43/50314 and 43/74084

[54] ELECTRONICALLY COMMUTATED MOTOR HAVING AN OUTSIDE ROTOR AND AN INSIDE POSITION DETECTOR
5 Claims, 12 Drawing Figs.

[52] U.S. Cl. ................................................ 318/254, 318/138, 310/156
[51] Int. Cl. ................................................ H02k 29/00
[50] Field of Search ................................................ 318/138, 254, 439; 310/49, 163, 162, 156

[56] References Cited
UNITED STATES PATENTS

| | | | |
|---|---|---|---|
| 1,309,159 | 7/1919 | Taylor | 318/254 |
| 2,155,557 | 4/1939 | Kranz | 318/254 |
| 3,284,687 | 11/1966 | Schlenker | 318/138 |
| 3,305,717 | 2/1967 | Weiss | 318/254 |
| 3,471,762 | 10/1969 | Urban | 318/138 |
| 3,508,091 | 4/1970 | Kavanaugh | 310/49 |

Primary Examiner—G. R. Simmons
Attorney—Wenderoth, Lind and Ponack

ABSTRACT: An electronically commutated motor having a multiple pole permanent magnet rotor. A position detecting means is located inside of the stator. This arrangement makes it easy to fabricate the stator and the position detecting means from the same sheet of laminated magnetic material with little material loss. A position detecting rotor having a plurality of teeth with short-circuited conductors thereon modulates the coupling between the primary and secondary windings in the position detecting windings during its rotation without disturbing the regular coupling of each pair of windings.

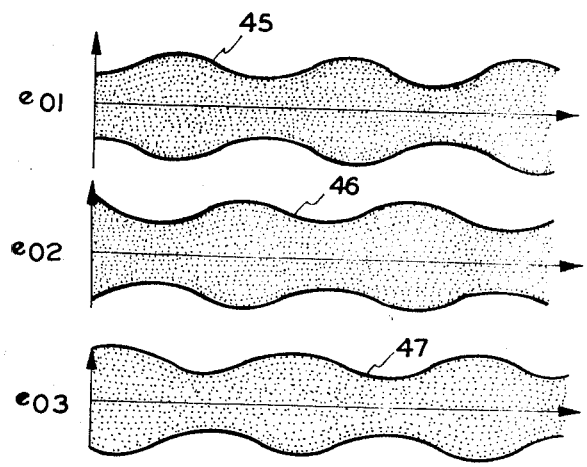

ELECTRONICALLY COMMUTATED MOTOR HAVING AN OUTSIDE ROTOR AND AN INSIDE POSITION DETECTOR

This invention relates to improved electric motors particularly to electronically commutated motors, and more particularly to those of the position detecting type.

A motor which is compact, selfstarting, which has a preselected direction of rotation, which has a smooth torque, and which is capable of operating on DC, is useful in electronic equipment for driving various movable components. Portable tape recorders, for example, require such a motor which in addition has very little torque ripple.

Up to this time many methods have been proposed relating to the commutation of electric current flowing through the armature winding, which methods utilize electronic devices such as photosensitive elements cooperating with a light source and a rotating slit, magnetic sensitive devices in combination with a permanent magnet, and an impedance commutator utilizing a saturable reactor (U.S. Pat. No. 2,797,375) or the mutual coupling of two coils (U.S. Pat. Nos. 1,971,188 and 2,644,916) all operating on relatively high frequency alternating current.

Many deficiencies of mechanically commutated motors, such as relatively short life due to the wearing of brushes and the commutator material, generation of electric, electromagnetic, and sonic noise due to the sparking and chattering between the brush and the commutator, and energy loss due to the friction between the brushes and the commutator material, are overcome by using any of the methods described above.

However, there do exist other difficulties in such brushless motors (hereinafter called electronically commutated motors). An electronically commutated motor employing photosensitive elements does not have a long life or a high efficiency because the light source usually has a relatively short life and poor efficiency of conversion of electric energy to light energy. The most prominent feature of the optical system which utilizes photosensitive elements is that it is easy to give the commutation signal an on-off characteristic, or in other words, to provide a discrete signal level for on-off operation.

A discontinuous commutating signal is necessary for high efficiency. The magnetic system and the impedance system are preferable to the optical system from the stand point of their length of useful life, although the commutation signal obtained by those systems is not a discontinuous one.

The impedance system, which is very inexpensive as compared to the other systems, produces a commutation signal which has very poor discontinuity, especially where the system has a simple construction.

In addition to discontinuity, two important features of the commutation signal are as follows:
 i. No dead zone should exist when changing from one phase signal to another phase signal. This will prevent incorrect starting.
 ii. No overlap of one phase with another phase should exist. This will prevent small torque ripple and promote high efficiency.

These two conditions are very difficult to satisfy simultaneously with the feature of good discontinuity in a commutation signal produced in an optical system, and with the feature of poor discontinuity in a commutation signal produced in a magnetic system or an impedance system.

The electronically commutated motor, according to our copending application, Ser. No. 803,218, has a commutation signal with the above mentioned important features without the disadvantages inherent in the use of the optical system, the magnetic system or the impedance system.

Briefly described, the motor according to that invention utilizes polyphase rectification by a base-emitter circuit of a transistor. The collector current of the transistor is used directly as armature current or is used as a commutating signal to control the power transistors which control the armature current.

The advantages of the invention of that copending application is to prevent overlap and dead zone, which are caused when using a gradually varying position signal. It is difficult to obtain a discontinuous position signal but it is easy to obtain a gradually varying position signal.

It is an object of the present invention to provide an improved electronically commutated motor having an improved position detecting construction which is most suitable for a multiple pole motor. It is a further object of the present invention to provide an electronically commutated motor in which, according to its construction, a sufficiently precise position signal can be obtained for a multiple pole motor. It is a still further object of the present invention to provide an electronically commutated motor in which a stator core, a position detecting stator and a position detecting rotor can be punched from the same sheet of silicon steel plate without loss of material.

Figure 2A:
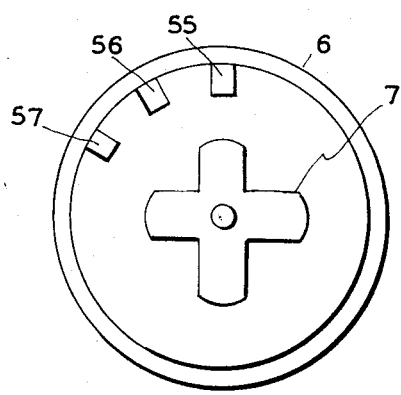
Figure 2B:
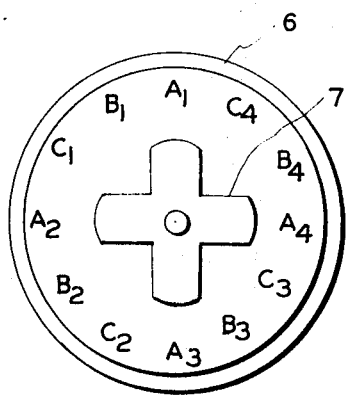
Figure 2C:
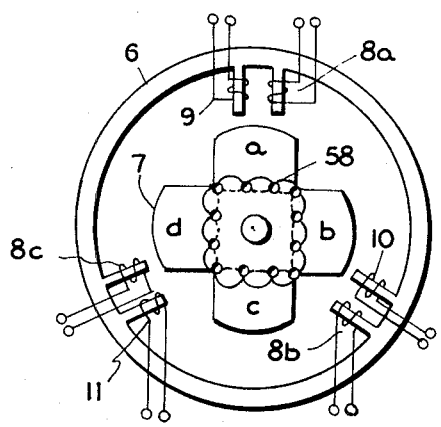

Other objects and advantages of the present invention will, of course, become apparent and immediately suggest themselves to those skilled in the art to which the invention is directed from a reading of the following specification in connection with the accompanying drawing in which:

FIG. 1 is a schematic circuit diagram of an electronically commutated motor apparatus according to the present invention;

FIGS. 2a—2c are diagrams of a position detecting means according to the present invention;

FIGS. 3a—3h are time diagrams for explaining the operation of the motor circuits of FIG. 1.

In the embodiment shown in FIG. 1 a stator 1 has 24 slots and three sets of windings 2, 3 and 4 wound thereon and connected in a three phase star connection.

A rotor 5 is rotatably positioned around the outside of the stator 1 and has a plurality of poles, preferably more than four. A position detecting means is positioned within the stator 1 and comprises a position detecting stator 6 positioned within the stator 1, a position detecting rotor 7 on the shaft of rotor 5, a set of primary windings (8a, 8b and 8c) and three secondary windings 9, 10 and 11 spaced around the position detecting stator 6.

The electromagnetic couplings between the respective primary windings 8a, 8b and 8c and the respective secondary windings 9, 10 and 11 are varied by the position detecting rotor 7 which should have more than two projections and which is here shown as having four. Strong electromagnetic coupling between these pairs of the primary and secondary windings is brought about four times during one rotation of the rotor 7, and each of the pairs consisting of a primary and a secondary winding has one of the projections on the position detecting rotor 7 directly facing it when the rotor 7 is moved 30° from the position in which the preceding projection faces the preceding pair of windings.

A transistor 20, resistors 21, 22 and 23, capacitors 24 and 25, and an oscillator coil 26 are connected in an oscillator circuit which generates a comparatively high frequency (100 Hz ~100 KHz) AC signal.

The output signal of the oscillator circuit is fed to said primary windings 8a, 8b and 8c through a capacitor 27.

Diodes 12, 13 and 14 are connected forwardly, with respect to current flow from the secondary windings between the one ends of the respective secondary windings and the respective bases of transistors 28, 29 and 30. Each of the other ends of the secondary windings 9, 10 and 11 are connected to one another and connected to a point at which a resistor 18 and a resistor 19 are connected to each other, said point hereinafter being designated as pedestal point 55. Resistors 18 and 19 are connected in series across power supply lines from terminals 36 and 37.

Capacitors 15, 16 and 17 are connected between the bases of the transistors 28, 29 and 30 and said pedestal point 55, respectively.

The emitters of the transistors 28, 29 and 30 are connected to one another. A resistor 34 and a capacitor 35 are connected in parallel between a power supplying terminal 37 and said commonly connected emitters of transistors 28, 29 and 30.

The bases of transistors 31, 32 and 33 are connected to the collectors of transistors 28, 29 and 30, respectively.

The emitters of the transistors 31, 32 and 33 are each connected to the other power supplying terminal 36.

The collectors of the transistors 31, 32 and 33 are connected to one end of said stator windings 2, 3 and 4, respectively and each of the other ends of said stator windings 2, 3 and 4 is connected to the power supplying terminal 37.

Transistors 28, 29 and 30 have a polarity opposite to that of transistors 31, 32 and 33; i.e., if transistors 31, 32 and 33 are PNP-type transistors, transistors 28, 29 and 30 are NPN-type transistors and vice versa. Said oscillator circuit is energized by the current fed from the power supplying terminals 36 and 37.

In operation, the output signal of said oscillator circuit is fed through the capacitor 27 to the primary windings 8a, 8b and 8c. A group of voltages are induced in the secondary windings 9, 10 and 11 in sequence during rotation of the rotor 7.

Each of the voltages appearing at the ends of the respective secondary windings has a frequency which is the same as the frequency of the output signal of the oscillator circuit, and has an amplitude varying according to the rotational angle of position detecting rotor 7. It will be understood that the position detecting rotor 7 modulates the amplitude of said voltage. The modulated signal is shown in FIGS. 3a—3c. In FIGS. 3a, 3b and 3c, curves 45, 46 and 47 show the envelopes of the output signal of the respective secondary windings. These curves show that said output signals are not greatly modulated, and the envelopes form a three phase curve family.

Diodes 12, 13 and 14 rectify said output signals form the secondary windings 10, 11 and 9 respectively, and capacitors 15, 16 and 17 filter out the carrier frequency, i.e. the frequency generated by the oscillator circuit. The voltages appearing between the pedestal point 55 and the output side (cathode in this case) of the respective diodes, are designated $e_1$, $e_2$ and $e_3$ and are shown in FIG. 3d as curves 48, 49 and 50. The voltage appearing between the pedestal point 55 and the power supplying terminal 37 is indicated as being $e_4$ in FIG. 1.

The resistors 18 and 19 are given a resistance so that the current flowing through them is comparatively large compared to the base current of transistors 28, 29 and 30. The diodes 12, 13 and 14 have an output impedance which is low compared to the base circuit impedance of said transistors 28, 29 and 30.

The output signal of the secondary windings 9, 10 and 11 are determined by the value of the peak to valley voltage difference of the voltages $e_1$, $e_2$ and $e_3$. When said peak to valley voltage difference is from about 0.5 volt to several volts, the transistors 28, 29 and 30 and resistor 34 act as a triple differential switching circuit.

The voltage $e_5$, appearing between the common emitter circuit of said transistors 28, 29 and 30 and the power supplying terminal 37, corresponds to the greatest voltage of the combined voltage $e_1+e_4$, $e_2+e_4$ and $e_3+e_4$. For example, the position of the position detecting rotor 7 shown in FIG. 1 is such that $e_3+e_4$ is the greatest of the three combined voltages.

The transistor to which the highest base emitter voltage is applied, in this instance transistor 30, feeds its emitter current to the resistor 34 and the voltage $e_5$ is nearly equal to $e_3+e_4$ —0.6 volts (when the transistors 28, 29 and 30 are silicon transistors). This state is designated the ON state of the transistor 30. On the other hand, the base emitter-voltages of the transistors 28 and 29 are very low and the base current and the collector current can not flow. This state is designated the OFF state of transistors 28 and 29.

The collector current of transistor 30, which is in the ON state, is supplied to the base of transistor 33, which then is turned to the ON state to supply collector current to the stator winding 4.

The current flowing through the stator winding 4 generates a torque in cooperation with permanent magnetized rotor 5. The rotation of the rotor 5, and consequently the rotation of the position detecting rotor 7, varies the voltages $e_1$, $e_2$ and $e_3$. If it is assumed that the torque generated by the current flowing through the stator windings 2, 3 and 4 and the rotor 5 has a clockwise direction, then when the rotor 5 rotates about 15° from the position shown in FIG. 1, the output signals of the secondary windings 9 and 10 have equal amplitudes and the voltages $e_3$ and $e_1$ become equal in value and the emitter current of transistor 30 is decreased and the emitter current of transistor 28 is increased.

At this point the two transistors 30 and 28 are in the same state, and both of them feed their emitter current to the resistor 34. With further rotation of rotor 5, the emitter current of transistor 30 decreases further and the emitter current of transistor 28 increases further. The sum of the emitter currents of transistors 30 and 28 is determined by the emitter voltage $e_5$ and the resistance value of resistor 34. As the voltage $e_5$ follows to the base potential of transistors 30 and 28, it remains almost constant, as shown in FIG. 3e. When the emitter current of each of transistors 30 and 28 has the same value, which is nearly equal to one half of the emitter current of a single transistor when it is in the ON state, this state is called the transitional state of transistors 30 and 28.

In the vicinity of the transitional state, the two transistors act as a differential amplifier. But the maximum voltage difference of the two secondary windings 9 and 10, i.e., the maximum difference of the input signal to the differential amplifying transistors 30 and 28, is predetermined so as to be sufficiently large to overcome the differential operation and to drive one of the two transistors into the ON state and the other into the OFF state. Thus the two transistors operate as a differential amplifier only for a very small rotational angle of the rotor 7. Therefore, transistor 30 and 28 switch from an ON to an OFF state and vice versa almost instantaneously.

The change of the states of the transistors 28 and 29, and 29 and 30 follow the same pattern as that for the transistors 30 and 28. The ON state of each of the transistors 28, 29 and 30 continues for about 30° of the rotation of the rotor 5, respectively, and it is repeated four times in sequence during one revolution of the rotor 7. Therefore the rotor 5 generates torque in one direction all during its rotation. The collector currents of the transistors 28, 29 and 30 are shown in FIGS. 3f—3h. Capacitor 35 eliminates undesirable parasitic oscillation.

The electronically commutated motor according to the present invention as described above has many advantages over the conventional electronically commutated motor.

In the first place, because the rotor is rotatably positioned outside of the stator, it is possible to get higher inertia force than that of the motor in which the rotor is positioned inside of the stator and accordingly fluctuation in rotating speed can be decreased. Further, because the outside rotor type motor can be smaller than the inside rotor type motor for generating the same torque, the electric loss in the iron or copper of the motor of the invention is less than that in a conventional motor and so higher efficiency is obtained.

Secondly, according to the invention, the detecting rotor is positioned inside of the stator, so that it is not necessary to provide added space for the position detecting rotor and the motor can be constructed so as to have a small size. On the contrary, the space inside of a stator is not used in the conventional outside-rotor type motor. Further, by placing the position detecting windings directly on the stator core, correlation between the positions of the stator windings and the position detecting windings can be exactly adjusted so as to produce a superior operation. Such a construction is suitable for mass production at a low cost. In such an outside-rotor type motor, if the correlation of the positions of the rotor, stator winding position detecting rotor and the position detecting winding is not exact, it causes deviation in the rotating speed and torque and reduces efficiency. However, according to the present invention, because the stator windings and the position detecting windings are placed on the same core as described above, the correlation of the positions of these windings can be made exact. Therefore, it is only necessary to adjust the correlation between the rotor and the position detecting rotor and such adjustment can be easily carried out because these rotors are mounted on the same shaft. The arrangement of the position detecting means comprising primary and secondary position detecting windings and a position detecting rotor is determined by the factors discussed below.

In FIG. 1, if one quarter rotation of the rotor 5 is defined as one period, to rotate the rotor 5, it is necessary to provide electric current to each of the three stator windings 2, 3 and 4 during one period. For this purpose, it is usually necessary to arrange the primary and secondary windings inside of one quarter portion of the circumference of the position detecting means 6, and such arrangement is shown in FIG. 2a.

Referring to FIG. 2a, 55, 56 and 57 designate the combination of the primary and secondary windings, respectively. As for the positioning of the primary and secondary windings of the primary and secondary windings, positioning parallel and positioning perpendicular to the shaft are the two types possible. Even a small type motor can provide space for arrangement of the primary and secondary windings parallel to the shaft. But the coupling flux from the primary windings to the secondary windings has a component parallel to the shaft and so isotropic material such as ferrite is required. On the other hand, from the manufacturing standpoint, use of silicon steel laminations or plate is preferred because it can be easily stamped with high accuracy. When the silicon steel plate is used, the parallel arrangement of the flux to the shaft is inconvenient and the primary and secondary windings are required to be arranged perpendicularly to the shaft. When such a perpendicular arrangement is required, the arrangement as shown in FIG. 2a is not suitable for a small type motor because the space factor is low and so the motor can not be miniaturized. FIG. 2(b) shows a novel method according to the present invention which overcomes this problem. Considering the periodicity of the position detecting rotor, it is understood that there are four points which become equivalent to each of primary and secondary windings 55, 56 and 57. These points are designated as $Ai$, $Bi$ and $Ci$ ($i=1, 2, 3$ or $4$), respectively in the figure. Therefore, it is possible to arrange the windings at the plate having extra space, for example, as shown in ($A_1$, $C_1$, $B_2$). The symmetrical points ($A_1$, $B_2$, $C_3$) have more extra space and they provide an effect owing to their symmetry. At first, undulation caused in the output of the secondary winding by the eccentricity of the position detecting rotor 7 has a time lag of one-third of a rotation with respect to the points A, B and C and consequently the period of the undulation becomes short and slightly random. Therefore, this undulation does not cause periodically changing current in the stator windings and so it does not become a deviation component of rotation of the rotor. The second effect is in the manufacturing, that is, because of the construction being symmetrical it can be constructed effectively on a manufacturing line.

In manufacturing, each of the position detecting windings can be attached to any of these three points and further it is not necessary to distinguish the face and the back of the silicon steel plate. This is shown in FIG. 1. However, a position detecting rotor having such a simple construction does not always operate well, and in such an arrangement there can be caused a mutual interference between positions $A_1$, $B_2$ and $C_3$. For example, in the figure, the signals from the primary windings 8a and 8c for the position signals of $A_1$ and $B_2$ induce the position signals in the secondary winding 10 for the position signal of $C_3$ through the poles $a$ and $b$, and $d$ and $b$ of the position detecting rotor 7, respectively. Consequently, current flows to the stator windings at an irregular position and normal rotation is obstructed. To overcome such a problem, in the present invention, a short winding 58, which is comprised of a material having a high electric conductivity such as copper plate or copper wire, is provided at the root of each pole of the position detecting rotor 7 so as to isolate electromagnetically these poles, as shown in FIG. 2(c). The magnetic flux flowing to the root of the poles induces electric current in said short winding 58, and that current induces magnetic flux which negates the first-mentioned flux. Consequently, each of the poles is almost completely isolated and normal rotation can be carried out. Such a short winding can be provided easily and cheaply without affecting the accuracy of the position detecting rotor. In the embodiment shown in FIG. 2(c), the root of each pole is divided to three portions and provided with the short winding 58, but it is obvious that an undivided winding or a greater number of divided windings having a similar effect.

As described hereinbefore, the electronically commutated motor according to the present invention can be manufactured with high accuracy and high efficiency. Moreover, the motor of the invention can provide a sure operation with very constant torque, in which the error within the manufacturing accuracy hardly causes deviation during one rotation.

Although a preferred embodiment of the invention has been set forth in detail, it is desired to emphasize that it is not intended to be exhaustive or necessarily limitative; on the contrary, the disclosure herein is for the purpose of illustrating the invention and thus to enable others skilled in art to adapt the invention in such ways as meet the requirement of particular applications, it being understood that various modifications may be made without departing from the scope of the invention.

What we claim is:

1. An electronically commutated motor comprising a rotor having a multiple pole permanent magnet;
   a stator having a set of stator windings and being positioned within the inner periphery of said rotor, said rotor being rotatable to rotate around the outside of said stator;
   a position detecting means having a position detecting stator and a position detecting rotor, said position detecting stator being positioned within the internal periphery of said stator and said position detecting rotor having a plurality of teeth and being rotatable inside of the position detecting stator and with said rotor, said position detecting means further having signal producing means producing a set of position signals under the influence of said teeth for indicating the relative rotational position of said stator and said rotor; and
   a current control means coupled to said signal producing means which is controlled by said position signals from said position detecting means and coupled to said stator windings for controlling the current flowing through said stator windings.

2. An electronically commutated motor as claimed in claim 1 in which said position detecting stator includes plurality of sets of primary and secondary windings and said position detecting rotor modulates the coupling between said primary and secondary windings.

3. An electronically commutated motor as claimed in claim 2 in which said position detecting rotor has short circuited conductors on each tooth interlinking the path of magnetic flux from one tooth to another tooth.

4. An electronically commutated motor in accordance with claim 1 wherein said position detecting rotor is made of laminated magnetic material.

5. An electronically communicated motor in accordance with claim 1 wherein said permanent magnet has $2n$ poles, said stator windings are arranged in $m$ phases, said position detecting rotor has $n$ teeth, and said signal producing means comprises $m$ pairs of position detecting windings positioned every $360/m°/m°$ around the inside of said position detecting stator.